United States Patent
Choo et al.

(10) Patent No.: US 7,113,251 B2
(45) Date of Patent: Sep. 26, 2006

(54) APPARATUS AND EXPOSURE MASK HAVING CYLINDRICAL BENDING PREVENTION MEMBER FOR FORMING A LIQUID CRYSTAL FENCE

(75) Inventors: Dae-Ho Choo, Yong-si (KR); Dong-Won Lee, Cheonan-si (KR); Gyo-Seung Ku, Pyeongtak-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 10/454,487

(22) Filed: Jun. 5, 2003

(65) Prior Publication Data

US 2004/0090586 A1 May 13, 2004

(30) Foreign Application Priority Data

Nov. 9, 2002 (KR) .................... 10-2002-0069468

(51) Int. Cl.
*G02F 1/1339* (2006.01)
(52) U.S. Cl. .................................. 349/190; 349/187
(58) Field of Classification Search ............. 349/153, 349/154, 155, 187, 189, 190; 355/53, 72, 355/75, 76

See application file for complete search history.

(56) References Cited

U.S. PATENT DOCUMENTS

| 4,000,407 | A | * | 12/1976 | Keller et al. ................ 362/218 |
| 4,873,470 | A | * | 10/1989 | Myers ......................... 315/240 |
| 6,863,845 | B1 | * | 3/2005 | Saito et al. .................. 252/587 |
| 2002/0167634 | A1 | * | 11/2002 | Watanabe et al. ........... 349/153 |
| 2003/0156271 | A1 | * | 8/2003 | Byun et al. .................... 355/75 |
| 2004/0001177 | A1 | * | 1/2004 | Byun et al. .................. 349/187 |

* cited by examiner

*Primary Examiner*—Andrew Schechter
*Assistant Examiner*—Michael H. Caley
(74) *Attorney, Agent, or Firm*—F.Chau & Associates, LLC

(57) ABSTRACT

In a backlight assembly, an assembled substrate on which a spacer including a light-curable material is formed is disposed on a base body and a light supply unit disposed on the base body provides a light to the assembled substrate so as to cure the spacer. An exposure mask formed with an opening is positioned at a path through which the light is supplied so as to selectively supply the light to the spacer of the assembled substrate.

14 Claims, 10 Drawing Sheets

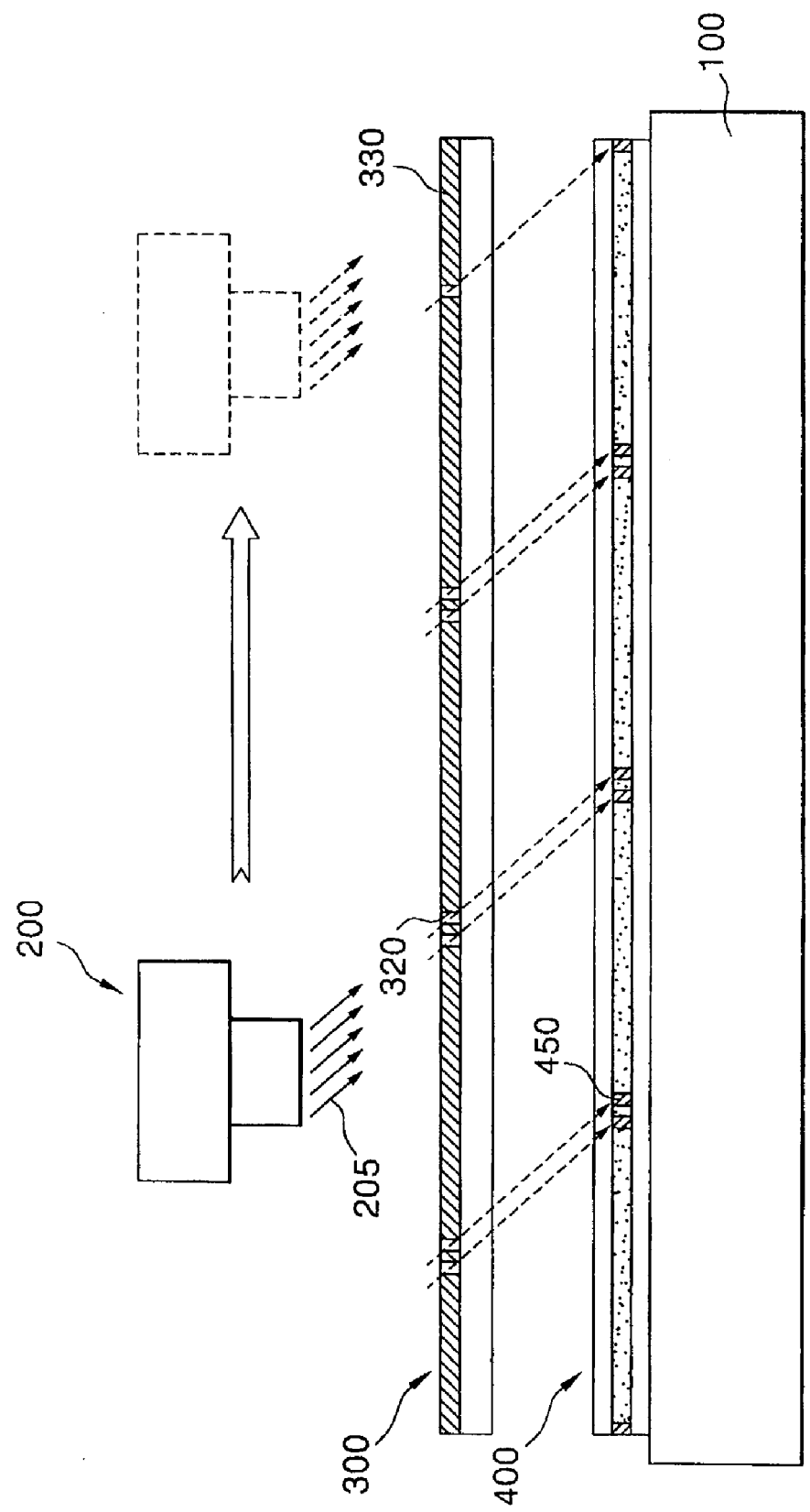

APPARATUS AND EXPOSURE MASK HAVING CYLINDRICAL BENDING PREVENTION MEMBER FOR FORMING A LIQUID CRYSTAL FENCE

CROSS-REFERENCE TO RELATED APPLICATION

This application relies for priority upon Korean Patent Application No. 2002-69468 filed on Nov. 9, 2002, the contents of which are herein incorporated by reference in its entirety.

BACKGROUND OF THE INVENTION

1. Field of the Invention

The present invention relates to an apparatus for forming a liquid crystal fence, and more particularly to an apparatus for forming a liquid crystal fence disposed between a TFT (Thin Film Transistor) substrate and a color filter substrate so as to provide a space for receiving liquid crystal and to couple the TFT substrate to the color filter substrate.

2. Description of the Related Art

In an LCD (Liquid Crystal Display) panel, liquid crystal is interposed between a TFT substrate and a color filter substrate manufactured through fabricating processes different from each other.

An alignment of the liquid crystal is changed corresponding to an electric field formed between the TFT and color filter substrates in response to an external power voltage, so the liquid crystal changes a transmittance of a light provided from an external environment.

The TFT substrate and color filter substrate are separated from each other with a predetermined distance (hereinafter, referred to as a cell gap) so as to provide a space for receiving the liquid crystal therebetween. The cell gap between the TFT substrate and the color filter substrate depends on inherent properties of the liquid crystal. For example, if an LCD panel has a liquid crystal of a TN (Twisted Nematic) mode, the cell gap is about 4.6 □.

In order to supply a liquid crystal to the cell gap between the TFT and color filter substrates, a method that supplies the liquid crystal in a vacuum state (referred to as a vacuum method) or a method that supplies the liquid crystal in a lower-pressure state than an atmospheric pressure (referred to as a dropping method) are generally used.

In the vacuum method, the LCD panel having the cell gap is dipped into a barrel in which the liquid crystal is received. When an inside of the cell gap is changed into the vacuum state, the liquid crystal is sucked up from the barrel into the cell gap due to a pressure difference between the inside of the cell gap and the barrel in which the liquid crystal is received. Thus, the inside of the cell gap may be filled up with the liquid crystal without a void.

However, in the vacuum method, the liquid crystal may be supplied to the inside of the cell gap much greater than a required amount of the liquid crystal. As a result, a pressing process is needed to drain the liquid crystal supplied to the inside of the cell gap after the liquid crystal is supplied to the cell gap. Also, processes, for example, such as a sealing process for sealing an inlet through which the liquid crystal is supplied and a cleaning process for cleaning the LCD panel stained with the liquid crystal while the liquid crystal is supplied, are separately needed.

In the dropping method, one of the TFT substrate and the color filter substrate is provided with a sealant that comprises an ultraviolet-curable material so as to define a liquid crystal receiving area. The liquid crystal is supplied to the liquid crystal receiving area defined by the sealant. The TFT substrate is assembled with the color filter substrate in the lower-pressure state than the atmospheric pressure after the liquid crystal is supplied to the liquid crystal receiving area. When the TFT substrate assembled with the color filter substrate is exposed to the atmospheric pressure, the liquid crystal disposed between the TFT and color filter substrates is uniformly diffused inside the liquid crystal receiving area due to the difference between the pressure of the liquid crystal receiving area of the LCD panel and the atmospheric pressure. Then, the sealant is cured by an exposure to ultraviolet rays.

However, the ultraviolet rays for curing the sealant is irradiated onto the TFT and color filter substrates and the liquid crystal with the sealant. As a result, an alignment layer of the TFT substrate may be damaged and the liquid crystal may be deteriorated.

SUMMARY OF THE INVENTION

The present invention provides an apparatus for forming a liquid crystal fence, which is capable of reducing damage of an LCD panel.

In one aspect of the invention, an apparatus for forming a liquid crystal fence includes a base body, an assembled substrate, a light supply unit and an exposure mask.

The assembled substrate is mounted on the base body. The assembled substrate is divided into a liquid crystal receiving area and a liquid crystal fence area surrounding the liquid crystal receiving area. Also, the assembled substrate includes two substrates and a spacer disposed between the two substrates, formed at the liquid crystal fence area and cured by an exposure to a light.

The light supply unit supplies the light to the assembled substrate.

The exposure mask is disposed on the assembled substrate so as to cut a first light of the light supplied to the liquid crystal receiving area and transmit a second light of the light supplied to the spacer, thereby changing the spacer into a liquid crystal fence.

According to the present invention, the light is selectively supplied to the spacer that couples the two substrates to each other and the liquid crystal is received in the liquid crystal receiving area, thereby preventing deterioration of the liquid crystal and an alignment layer or the like.

Furthermore, the apparatus may prevent an increase in the temperature in and around both the assembled substrate and the light supply unit, due to heat emitted from the light supply unit while the light is supplied to the spacer.

BRIEF DESCRIPTION OF THE DRAWINGS

The above and other advantages of the present invention will become readily apparent by reference to the following detailed description when considered in conjunction with the accompanying drawings wherein:

FIG. 10 is a schematic view showing an apparatus for forming a liquid crystal fence according to another exemplary embodiment of the present invention.

DETAILED DESCRIPTION OF THE INVENTION

Figure 1:
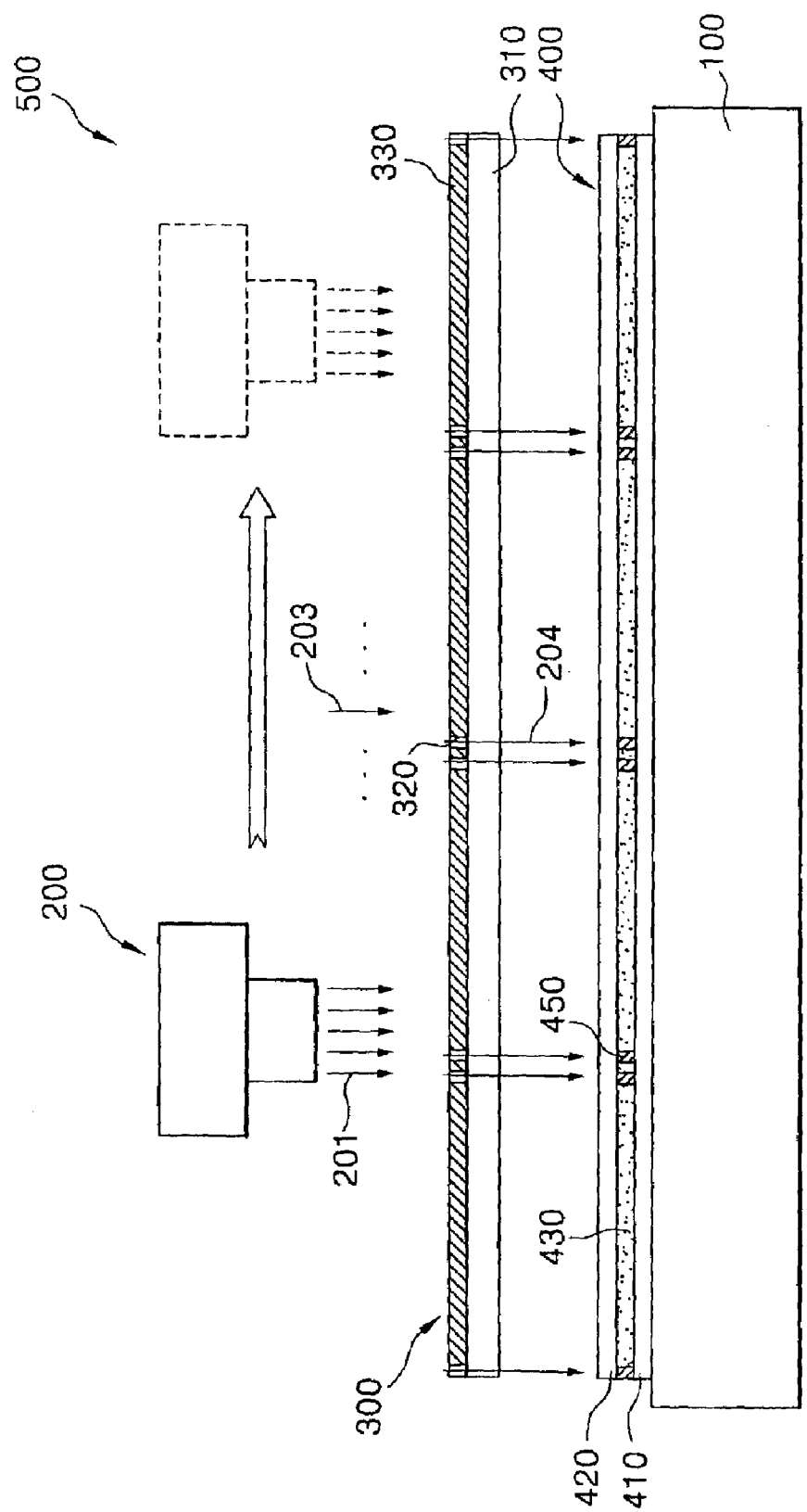
FIG. 1 is a schematic view showing an apparatus for forming a liquid crystal fence according to an exemplary embodiment of the present invention.
Figure 2:
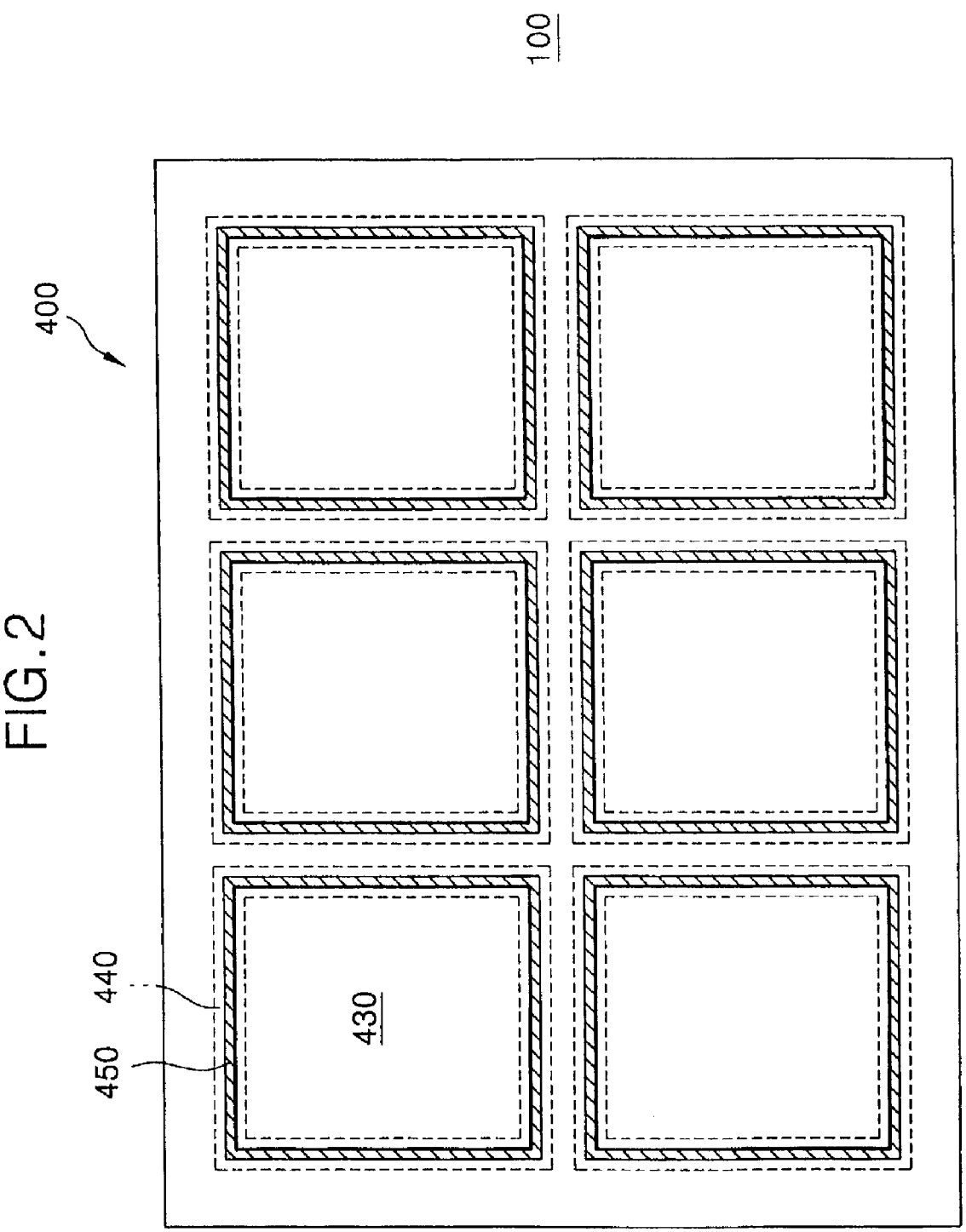
FIG. 2 is a plan view showing an assembled substrate shown in FIG. 1.

FIG. 1 is a schematic view showing an apparatus for forming a liquid crystal fence according to an exemplary embodiment of the present invention. FIG. 2 is a plan view showing an assembled substrate shown in FIG. 1.

Referring to FIGS. 1 and 2, an apparatus 500 for forming a liquid crystal fence includes a base body 100, a light supply unit 200 and an exposure mask 300.

The base body 100 is provided with an assembled substrate 400. The assembled substrate 400 mounted on the base body 100 includes two substrates 410 and 420 and a spacer 450 disposed between the two substrates 410 and 420. The assembled substrate 400 is divided into at least one liquid crystal receiving area 430 and a liquid crystal fence area 440 surrounding the liquid crystal receiving area 430. The spacer 450 is formed at the liquid crystal fence area 440 and comprises a light-curable material cured by an exposure to a light 201.

As shown in FIG. 1, the light supply unit 200 is disposed on the base body 100 so as to supply the light 201 to the assembled substrate 400 mounted on the base body 100. The light emitted from the light supply unit 200 comprises ultraviolet rays.

Figure 3:
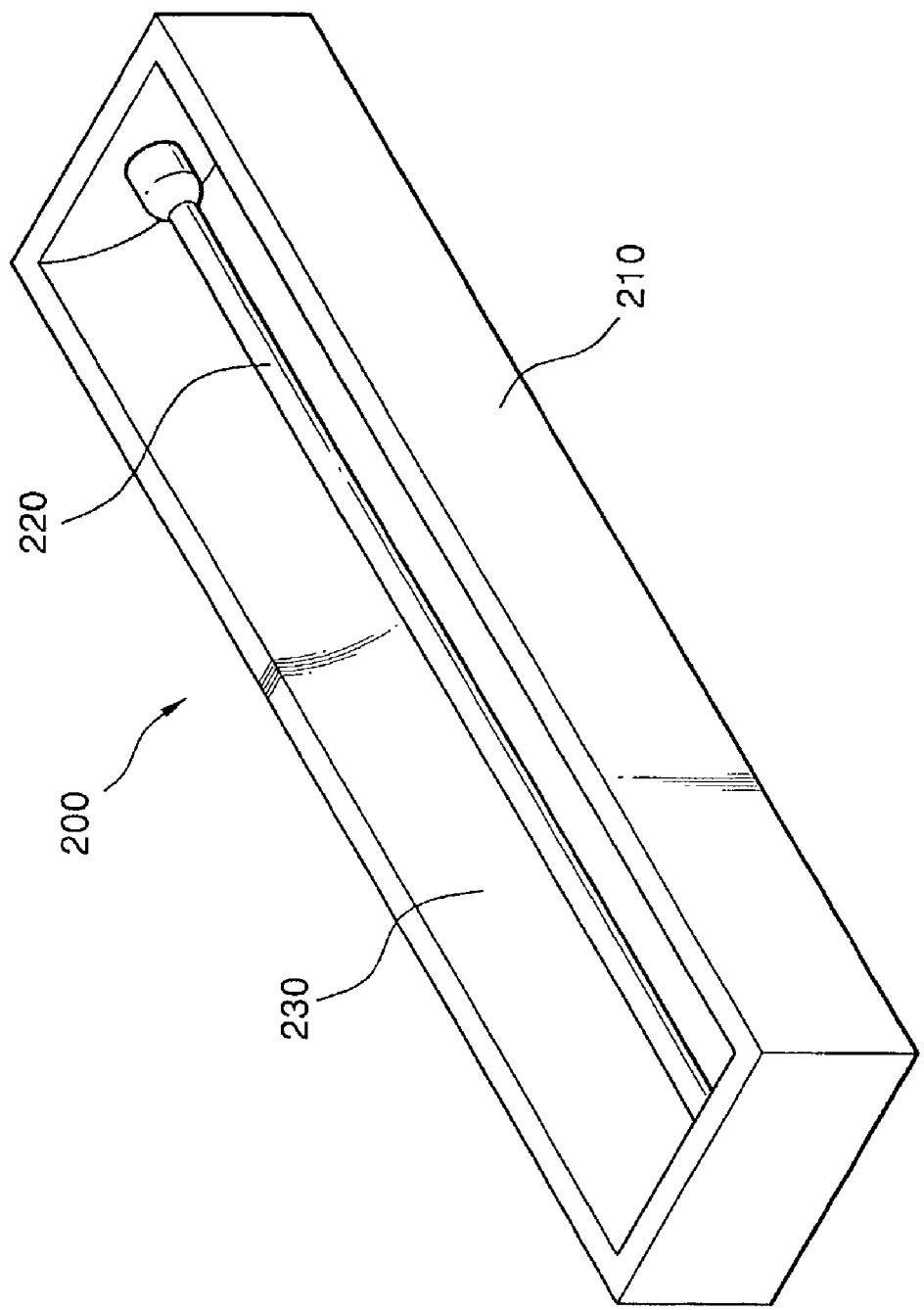
FIG. 3 is a perspective view showing a light supply unit according to an exemplary embodiment of the present invention.

FIG. 3 is a perspective view showing a light supply unit according to an exemplary embodiment of the present invention.

Referring to FIG. 3, the light supply unit 200 includes a housing 210, a lamp 220 and a condensing cover 230.

The housing 210 has a rectangular box shape having an opening through which the lamp 220 is inserted or ejected. The housing 210 includes a condensing cover 230 installed inside the housing 210.

The condensing cover 230 has a half-round shape and comprises a material having a superior light reflectance. The condensing cover 230 is received into the housing 210 such that an inner surface of a protruded portion is outwardly exposed.

The lamp 220 is received in the condensing cover 230 so as to be surrounded by the condensing cover 230. In this exemplary embodiment, the lamp 220 includes a mercury lamp that emits the ultraviolet rays 201 having a peak wavelength of 365 nm (nanometers). This is because the spacer 450 shown in FIG. 1 is cured by an exposure to the ultraviolet rays 201 having the peak wavelength of 365 nm.

The ultraviolet rays 201 radially emitted from the lamp 220 are condensed by means of the condensing cover 230 and irradiated onto the assembled substrate 400 shown in FIG. 1.

The light supply unit 200 supplies the ultraviolet rays 201 to the assembled substrate 400 while the light supply unit 200 is transferred by means of a transferring apparatus (not shown).

The lamp 220 emits an infrared rays, for example, such as a first infrared rays having a wavelength of 1014 nm, a second infrared rays having a wavelength of 1128 nm, a third infrared rays having a wavelength of 1367 nm and a fourth infrared rays having a wavelength smaller than 1014 nm or greater than 1367 nm, with the ultraviolet rays 201. The infrared rays include the first to fourth infrared rays of 45%, 17%, 15% and 23%, respectively.

The infrared rays emitted from the lamp 220 with the ultraviolet rays 201 are a heat rays, so that a temperature rise in and around the lamp 220, for example, such as the assembled substrate 400 and the base body 100 etc., may be caused. Particularly, in a case that the assembled substrate 400 is exposed to a temperature higher than an allowable temperature for a long time, the heat emitted from the lamp 220 has to be removed quickly since the assembled substrate 400 may be damaged due to the heat.

Figure 4:
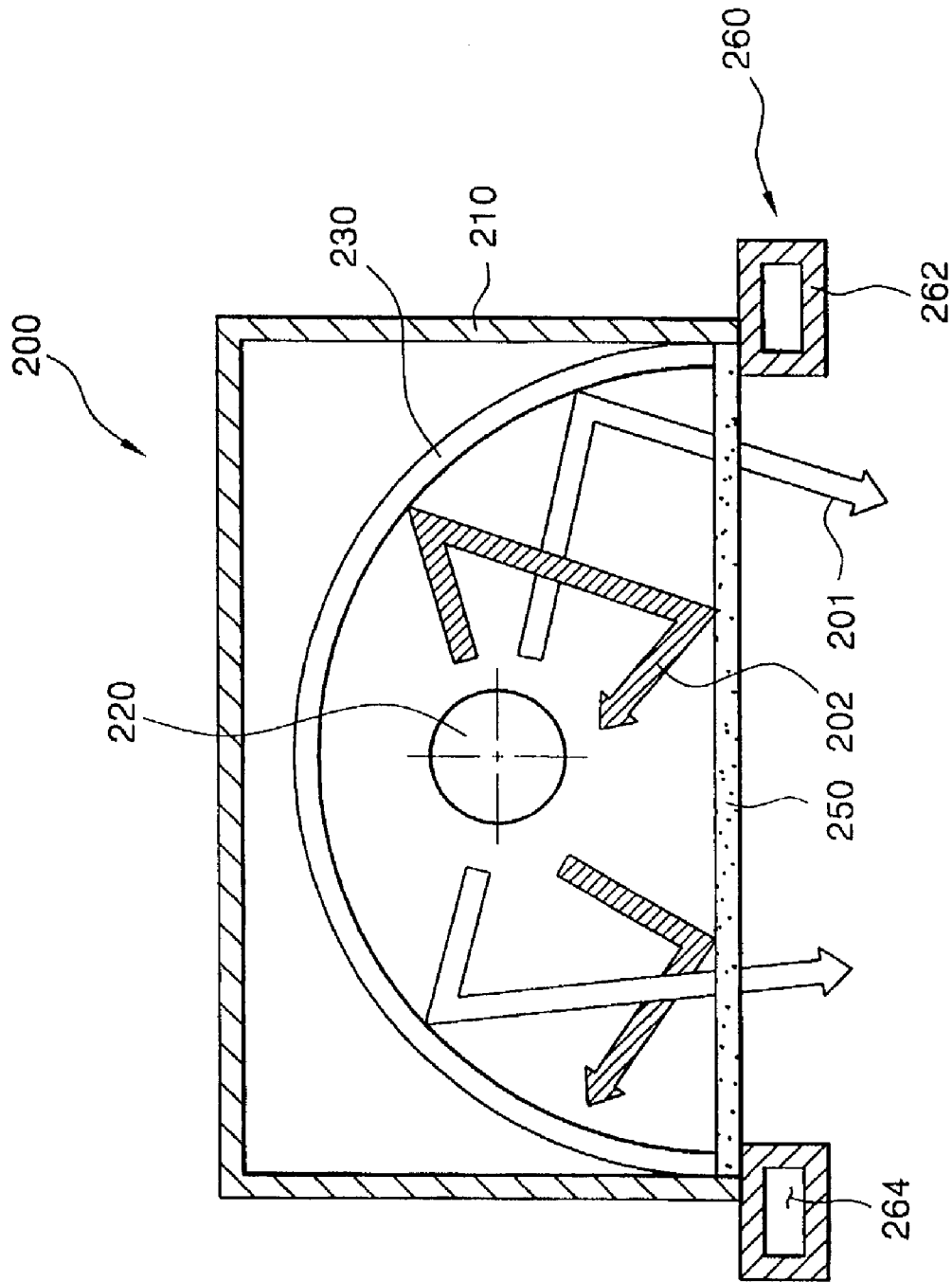
FIG. 4 is a schematic view showing an infrared rays filter for removing heat emitted from a light supply unit shown in FIG. 3 and a water-cooling type cooling unit.

FIG. 4 is a schematic view showing an infrared rays filter for removing heat emitted from a light supply unit shown in FIG. 3 and a water-cooling type cooling unit.

Referring to FIG. 4, an infrared rays filter 250 is installed at a path, for example, such as the opening of the condensing cover 230 through which the ultraviolet rays 201 from the lamp 220 is emitted, and a water-cooling type cooling unit 260 is installed in association with the infrared rays filter 250.

The infrared rays filter 250 may be manufactured in a manner that a water glass solution is coated over a plate glass or a dye that absorbs the infrared rays is coated over the plate glass after melting a surface of the plate glass.

In order to cure the spacer 450, the infrared rays filter 250 transmits the ultraviolet rays 201 having the wavelength of 365 nm, and absorbs or reflects the infrared rays 202 having the wavelength from about 1000 nm to about 1400 nm to the condensing cover 230. Thus, an inside temperature of the light supply unit 200 may increase but an external temperature of the light supply unit 200 may not increase.

The inside temperature of the light supply unit 200 increased due to the infrared rays reflected from the infrared rays filter 250 to the condensing cover 230 may decrease by using the water-cooled type cooling unit 260.

The water-cooled type cooling unit 260 has a pipe shape. The water-cooled type cooling unit 260 includes a circulation pipe 262 through which a coolant 264 is circulated and a circulation unit (not shown) for circulating the coolant 264 inside the circulation pipe 262. The circulation pipe 262 is installed at an edge of the infrared rays filter 250.

By cutting the infrared rays 202 emitted from the lamp 220 using the infrared rays filter 250 and cooling the infrared rays filter 250 using the water-cooled type cooling unit 260, the temperature in and around the lamp 220 may be maintained at about 60 Celsius degrees even when the lamp 200 having a high power of about 10 KW is always driven.

Referring to FIG. 1 again, the ultraviolet rays 201 emitted from the light supply unit 200 are provided to the exposure mask 300 disposed on the base body 100.

The exposure mask 300 cuts an ultraviolet rays 203 (hereinafter, referred to as a first light) supplied to the liquid crystal receiving area 430 of the ultraviolet rays 201 emitted from the light supply unit 200 and transmits a light 204

(hereinafter, referred to as a second light) supplied to the spacer 450. The spacer 450 is exposed to the second light 204 and changed into a liquid crystal fence having a high strength.

Figure 5:
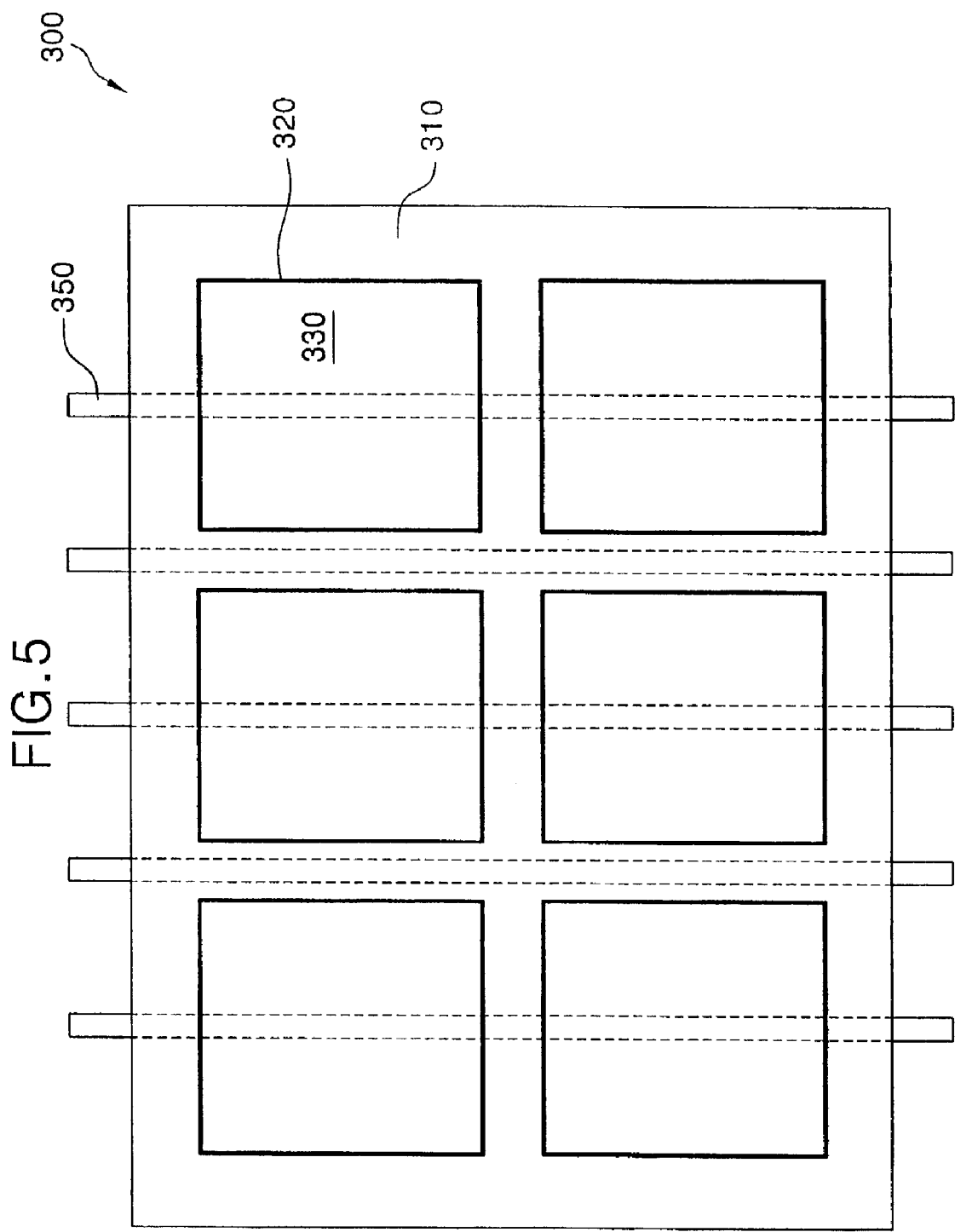
FIG. 5 is a plan view showing an exposure mask according to an exemplary embodiment of the present invention.

FIG. 5 is a plan view showing an exposure mask according to an exemplary embodiment of the present invention.

Referring to FIGS. 1 and 5, the exposure mask 300 includes a transparent substrate 310 and a light-cutting layer 330 formed on the transparent substrate 310 and partially opened so as to transmit the second light 204 to the spacer 450. The light-cutting layer 330 is a chrome thin layer that a chrome material is deposited on the transparent substrate 310 using a sputtering method and the chrome thin layer is patterned by a photolithography to form the opened portion 320.

In this exemplary embodiment, the transparent substrate 310 comprises glass or quartz and has a same size as that of the assembled substrate 400. Also, the transparent substrate 310 may have a thickness of 0.7 mm, 0.63 mm or 0.5 mm identical to a thickness of a TFT substrate and a color filter substrate of the assembled substrate 400.

Recently, the exposure mask 300 has been gradually scaled up in accordance with scaling-up of the assembled substrate 400. Although the assembled substrate 400 is scaled-up, the assembled substrate 400 may not be bent because the assembled substrate 400 is mounted on the base body 100. However, since the transparent substrate 310 of the exposure mask 300 is spaced apart from the base body 100, the transparent substrate 310 may be bent due to a dead load thereof.

If the transparent substrate 310 of the exposure mask 300 is bent, the light-cutting layer 330 formed on the transparent substrate 310 is deformed with the transparent substrate 310, so the second light 204 may not be supplied to the spacer 450.

When the second light 204 is not supplied to the spacer 450 of the assembled substrate 400 or a part of the second light 204 is irradiated onto the spacer 450, the spacer 450 may not be cured or may be partially cured, thereby deteriorating the strength of the liquid crystal fence. As a result, a display quality of the LCD panel may be deteriorated because the cell gap between the TFT and color filter substrates is not uniform. Also, the TFT and color filter substrates may be separated from each other due to the cell gap not uniform and the liquid crystal interposed between the TFT and color filter substrates may be leaked at a portion where the strength of the spacer 450 is deteriorated.

In order to prevent the transparent substrate 310 of the exposure mask 300 from being bent due to the dead load thereof, the exposure mask 300 further includes at least one bending prevention member 350.

Referring to FIG. 5, a plurality of supporters 350 is installed at the transparent substrate 310 of the exposure mask 300 as the bending prevention member 350. In this exemplary embodiment, since the supporters 350 have structure and function identical to each other, one of the supporters 350 will be described in detail and represented by a reference numeral "350". The supporter 350 is transparent and has a prism shape and a length suitable for supporting the transparent substrate 310. The supporter 350 is installed across the transparent substrate 310 of the exposure mask 300.

Figure 6:
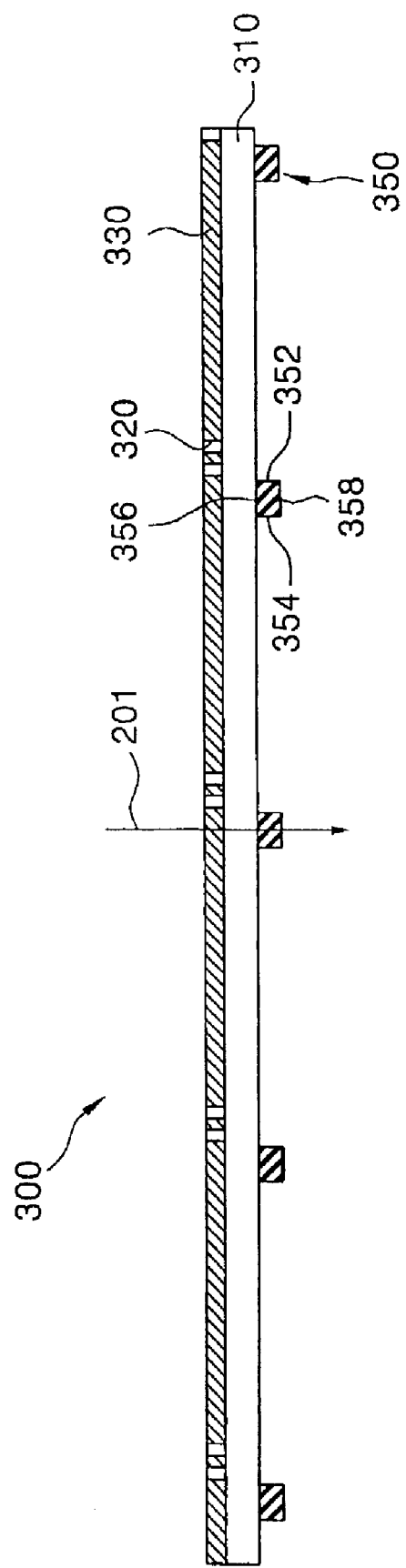
FIG. 6 is a schematic view showing a bending prevention member for an exposure mask according to an exemplary embodiment of the present invention.

FIG. 6 is a schematic view showing a supporter for an exposure mask according to an exemplary embodiment of the present invention.

Referring to FIG. 6, a supporter 350 has a rectangular prism shape. The supporter 350 includes first, second, third and fourth side surfaces 352, 354, 356 and 358 connected to each other. The first side surface 352 makes contact with the transparent substrate 310 of the exposure mask 300 and the second side surface 354 faces the first side surface 352 in parallel.

In case that the first and second side surfaces 352 and 354 are parallel to each other, the refraction of the ultraviolet rays 201 passing through the transparent substrate 310 and the supporter 350 may be reduced when the ultraviolet rays 201 are incident in a vertical direction with respect to the transparent substrate 310 of the exposure mask 300.

Figure 7:
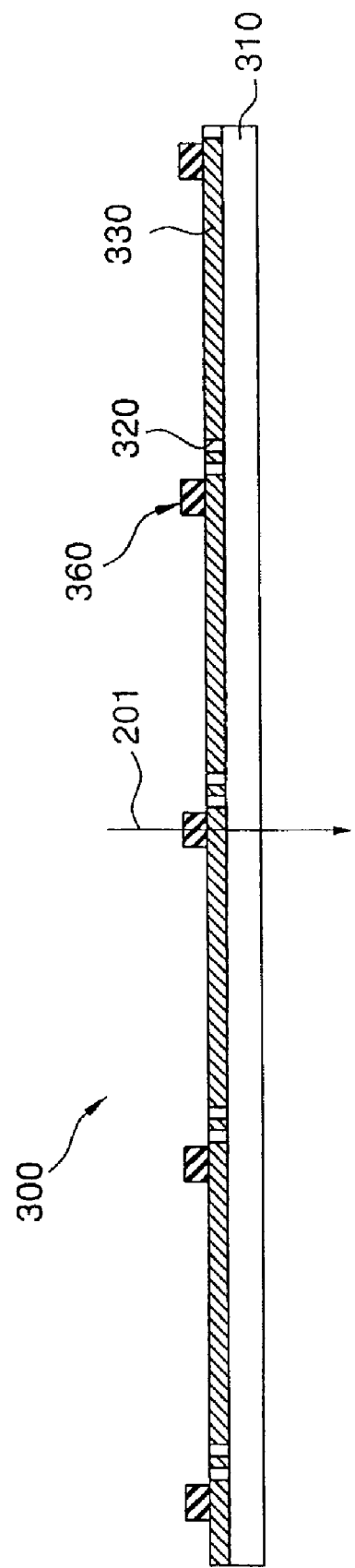
FIG. 7 is a schematic view showing a bending prevention member for an exposure mask according to another exemplary embodiment of the present invention.

FIG. 7 is a schematic view showing a supporter for an exposure mask according to another exemplary embodiment of the present invention. In FIG. 7, a supporter is represented by a reference numeral "360".

Referring to FIG. 7, a supporter 360 is disposed on the light-cutting layer 330 formed on the transparent substrate 310 of the exposure mask 300. In similar, the supporter 360 has same structure and function as in those of the supporter 350 shown in FIG. 6. Also, in the supporter 360, a first side surface that makes contact with the light-cutting layer 330 and a second side surface that faces the first side surface are parallel to each other so as to reduce the refraction of the ultraviolet rays 201 provided from the light supply unit 200.

Figure 8:
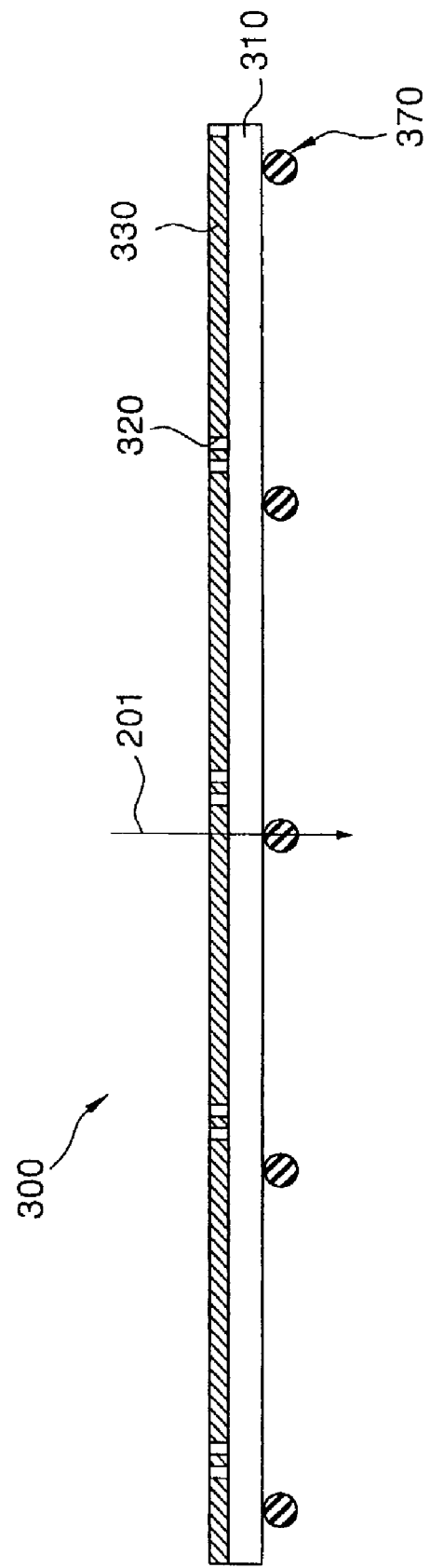
FIG. 8 is a schematic view showing a bending prevention member for an exposure mask according to another exemplary embodiment of the present invention.

FIG. 8 is a schematic view showing schematic a supporter for an exposure mask according to another exemplary embodiment of the present invention. In FIG. 8, a supporter is represented by a reference numeral "370".

Referring to FIG. 8, a supporter 370 has a cylindrical shape. The supporter 370 makes contact with a lower surface of the transparent substrate 310 of the exposure mask 300.

Figure 9:
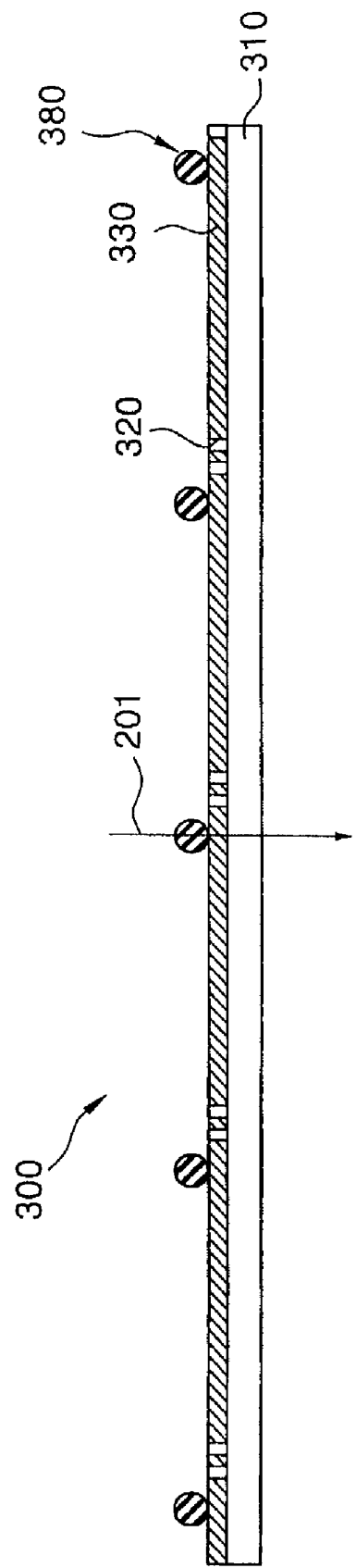
FIG. 9 is a schematic view showing a bending prevention member for an exposure mask according to another exemplary embodiment of the present invention.

FIG. 9 is a schematic view showing a supporter for an exposure mask according to another exemplary embodiment of the present invention. In FIG. 9, a supporter is represented by a reference numeral "380".

Referring to FIG. 9, a supporter 380 has a cylindrical shape. The supporter 370 makes contact with an upper surface of the light-cutting layer 330 formed on the transparent substrate 310 of the exposure mask 300.

In order to reduce the refraction of the ultraviolet rays 201, the supporters 370 and 380 having the cylindrical shape as shown in FIG. 8 may be applied to a case that the ultraviolet rays 201 are irradiated onto the assembled substrate 400 in an inclined direction with respect to the assembled substrate 400 as shown in FIG. 10.

FIG. 10 is a schematic view showing an apparatus for forming a liquid crystal fence according to another exemplary embodiment of the present invention. In this exemplary embodiment, a detailed description of a base body 100 and an assembled substrate 400 having same structure and function as in those of the base body 100 and assembled substrate 400 will be omitted.

Referring to FIG. 10, a light supply unit 200 irradiates ultraviolet rays 205 onto an upper surface of the base body 100 in an inclined direction with respect to an imaginary line perpendicular to an upper surface of the base body 100. In order to irradiate the ultraviolet rays 205 onto the spacer 450 in the inclined direction with respect to the imaginary line, an opening, through which the ultraviolet rays 205 are emitted, of a housing 210 of the light supply unit 200 may be adjusted so as to be inclined with respect to the imaginary line at a predetermined angle.

When the ultraviolet rays 205 emitted from the light supply unit 200 are irradiated onto the spacer 450 in the inclined direction with respect to the imaginary line, the ultraviolet rays 205 may be easily irradiated onto the spacer 450 regardless of parts of an assembled substrate 400, for example, such as a black matrix and gate and data lines and so on.

Accordingly, an efficiency of the ultraviolet rays 205 may be improved when the ultraviolet rays 205 emitted from the light supply unit 200 are irradiated onto the spacer 450 in the inclined direction with respect to the imaginary line than the ultraviolet rays 205 are irradiated onto the spacer 450 in a direction parallel to the imaginary line.

The ultraviolet rays 205 emitted from the light supply unit 200 are supplied to the spacer 450 through an opening 320 formed at a light-cutting layer 330 of the exposure mask 400.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An apparatus for manufacturing a liquid crystal display (LCD), comprising:
   a base body supporting a panel comprising two substrates and a plurality of spacers disposed between the two substrates, the panel being divided into a plurality of sections arranged in a matrix and each section being divided into a liquid crystal receiving area and a liquid crystal fence area surrounding the liquid crystal receiving area, each spacer being formed within the liquid crystal fence area;
   a light supply unit supplying a light to the panel; and
   an exposure mask entirely covering the panel and arranged between the panel and the light supply unit, the exposure mask comprising a plurality of openings corresponding to the liquid crystal fence areas to expose the liquid crystal fence areas to the light to change the spacers into liquid crystal fences while preventing the liquid crystal receiving areas from being exposed to the light; and
   a bending prevention member supporting the exposure mask to prevent the exposure mask from being bent, wherein:
   the bending prevention member is transparent;
   a shape of the bending prevention member is adjusted according to an incident angle of the light so that refraction of the light is reduced; and
   the bending prevention member has a cylindrical shape to reduce refraction of the light when the light is irradiated in an inclined direction with respect to an upper surface of the panel.

2. The apparatus of claim 1, wherein the spacers comprise an ultraviolet-curable material, and the light is ultraviolet rays.

3. The apparatus of claim 1, wherein the light supply unit comprises:
   a lamp for emitting ultraviolet rays; and
   a condensing cover condensing the ultraviolet rays emitted from the lamp.

4. The apparatus of claim 3, wherein the light supply unit further comprises a filter for cutting infrared rays emitted from the lamp.

5. The apparatus of claim 4, wherein the light supply unit further comprises a cooling unit circulating a coolant.

6. The apparatus of claim 5, wherein the cooling unit is a water-cooled type cooling unit disposed at an edge of the filter, and the water-cooled type cooling unit includes a circulation pipe through which the coolant is circulated.

7. The apparatus of claim 4, wherein the filter is coated with a dye absorbing the infrared rays of the light.

8. The apparatus of claim 1, wherein the light supply unit irradiates the light in a direction perpendicular to an upper surface of the panel.

9. The apparatus of claim 1, wherein the light supply unit irradiates the light in a direction inclined with respect to an upper surface of the panel.

10. The apparatus of claim 1, wherein the exposure mask comprises:
    a transparent substrate; and
    a light-cutting layer formed on the transparent substrate and partially opened so as to transmit the light towards the spacers.

11. The apparatus of claim 10, wherein the transparent substrate is formed of glass or quartz, and the light-cutting layer is formed of chrome.

12. The apparatus of claim 1, wherein the bending prevention member is formed of quartz.

13. The apparatus of claim 1, wherein the bending prevention member is disposed on a surface of the exposure mask facing the light supply unit.

14. The apparatus of claim 1, wherein the bending prevention member is disposed on a surface of the exposure mask facing the panel.

* * * * *